358-190. XR 3,510,578 SR

May 5, 1970 L. J. BAZIN 3,510,578

TELEVISION CAMERA POWER SUPPLY

Filed March 30, 1967

T5135
X5117
R

INVENTOR
LUCAS J. BAZIN

BY W. A. Sprague
ATTORNEY

United States Patent Office 3,510,578
Patented May 5, 1970

3,510,578
TELEVISION CAMERA POWER SUPPLY
Lucas J. Bazin, Stratford, N.J., assignor to RCA Corporation, a corporation of Delaware
Filed Mar. 30, 1967, Ser. No. 627,045
Int. Cl. H04n 5/26
U.S. Cl. 178—7.1 6 Claims

ABSTRACT OF THE DISCLOSURE

A relatively high voltage direct current is keyed on during horizontal blanking intervals and off during horizontal signal-producing intervals to produce pulses which are integrated to produ: a relatively low voltage direct current supply, any deviation of which from a reference voltage is detected to produce a control signal by which the ratio of the on-to-off keying periods is adjusted to maintain the voltage of the low voltage supply substantially constantly equal to the reference voltage.

In the operation of television apparatus, such as cameras, it is necessary to provide a regulated power supply at the location of such apparatus often by means of cables of considerable length. For the most efficeint operation of such a regulated power supply it has been found convenient to convert a relatively high voltage direct current to a lower voltage for use by the television apparatus whether or not cables are used. The conversion of the high voltage to the low voltage may conveniently be done by keying the high voltage supply on and off to produce periodic high voltage pulses which are then integrated to form the desired low voltage direct current supply. It has been found that, when the keying operation is effected at a rate which is not related to the scanning rate employed to develop signals from the camera or other television apparatus, spurious effects such as keying transients, are created which, when they occur during line scanning intervals, distort the generated video signals and thereby produce distortions in a picture made from such signals.

It, therefore, is an object of the invention to produce a relatively low voltage direct current power supply for television apparatus by keying a relatively high voltage direct current supply synchronously during signal blanking intervals.

In accordance with the invention, a relatively high voltage dircet current supply is keyed on during line blanking intervals and off during signal-producing intervals, thereby generating a series of relatively short duration pulses. These pulses are then impressed upon a low pass filter from which is derived the relatively low voltage direct current supply. In order to maintain the low voltage supply substantially constant irrespective of voltage variations, for example, in the high voltage supply, a control signal representative of any deviation of the low voltage from a fixed reference voltage is produced by a regulating means. The control signal is applied to the keying means to vary the ratio of the operative and inoperative periods thereof, thereby maintaining the low voltage substantially constant.

For a more complete disclosure of the invention, reference may be made to the following description which is taken in conjunction to the accompanying drawings of which:

Figure 1:
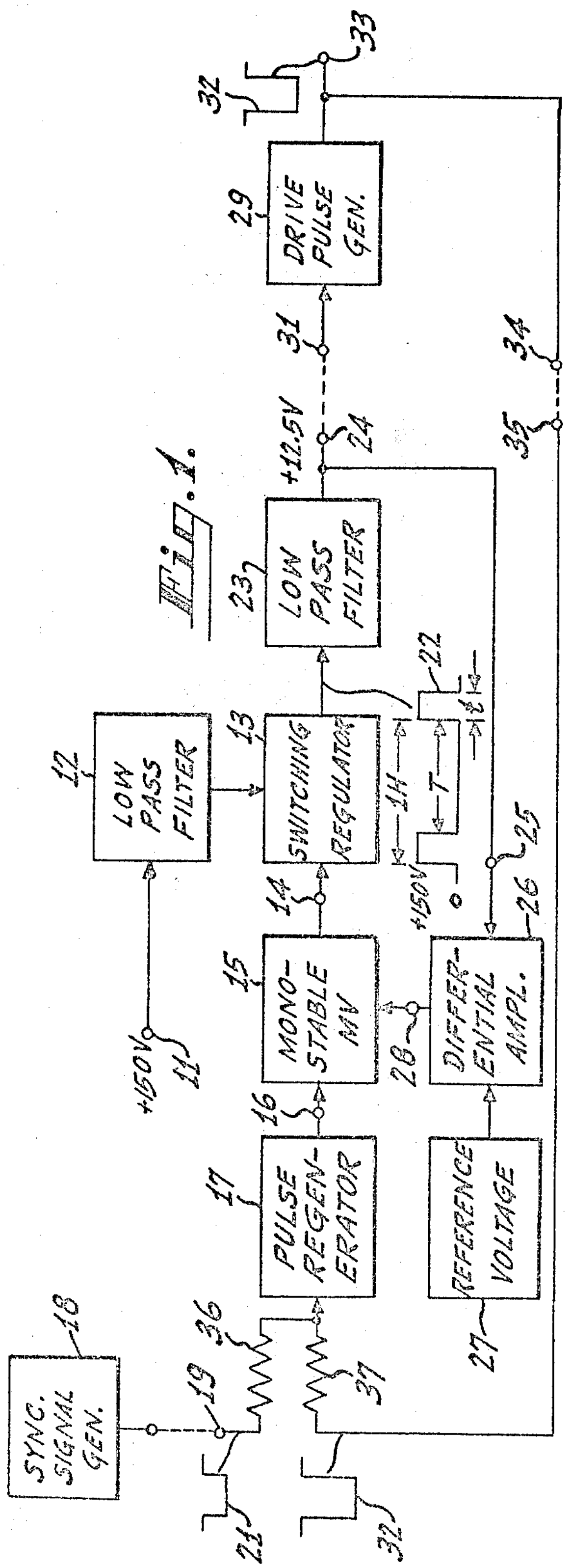
FIG. 1 is a block diagram of the low voltage power supply embodying the invention.

In FIG. 1 the low voltage power supply is embodied in a module having an input terminal 11 which may, for example, be connected to a cable and upon which is impressed the relatively high voltage direct current, in this case having a nominal voltage of 150 volts. The high voltage at terminal 11 is passed through a low pass filter 12 to a keying device such as the switching regulator 13. The function of the low pass filter 12 is to prevent any switching transients from being reflected back through terminal 11 to the television camera cable where they might produce objectionable spurious signal effects during blanking intervals by coupling to the other cable conductors through which video signals are being transferred, for example. While such spurious signals will have no effect upon the picture-porducing video signals, they might adversely affect the operation of some of the signal processing apparatus, such as clamps, for example, which function during blanking intervals. The switching regulator 13 is controlled by switching pulses derived from the output terminal 14 of a monostable multivibrator 15. The multivibrator in turn is operated from its stable state to its unstable state by means of trigger pulses applied to its input terminal 16 from a pulse regenerator 17. The regenerator 17 derives its pulses initially from a synchronizing signal generator 18 which is connected to a pulse input terminal 19. The generator 18 is energized independently of the low voltage power supply of FIG. 1 and the pulses derived therefrom are horizontal or line synchronizing pulses 21.

The switching regulator 13 produces in its output a series of high voltage pulses 22. These pulses occur at the horizontal line repetition rate during the horizontal blanking intervals. The leading edges of the pulses 22 are produced in response to the multivibrator 15 being operated from its stable state to its unstable state. The trailing edges of the pulses 22 are produced in response to the multivibrator 15 being operated from its unstable state to its stable state. The time duration $t$ or width of the pulses 22, therefore, is controlled by the time that the multivibrator 15 remains in its unstable state. As will be more fully desrcibed subsequently, this time is dependent upon a control signal voltage applied to a time constant circuit of the multivibrator 15.

The series of pulses 22 are integrated by passing them through a low pass filter 23 to form a relatively low voltage direct current supply at an output terminal 24 of the module. In the present case, this voltage is substantially 12.5 volts and depends upon the ratio of the operative-to-inoperative periods of the switching regulator 13. With respect to the pulses 22, the operative period is represented by $t$ and the inoperative period is represented by T. Should the high voltage direct current supplied to terminal 11 vary from its nominal 150 volt value, the low voltage supplied to terminal 24 also would vary. In order to maintain the low voltage supply substantially constant at its 12.5 volt value, it is necessary to alter the ratio of $t/T$. This may be accomplished by varying the width or time duration of the pulses 22. Since the leading edges of these pulses always start at fixed times, the pulse width may be varied by changing the timing of the trailing edges of the pulses. For this purpose, the low voltage direct current supply at terminal 24 is applied to the input terminal 25 of a differential amplifier 26 to which also is applied a fixed reference voltage applied from a reference voltage source 27. Any deviation detected by the differential amplifier 26 of the voltage at terminal 24 from that of the reference source 27 produces a control signal at the output terminal 28 of the differential amplifier 26. This control signal is applied to the time constant circuit of the multivibrator 15 which correspondingly varies the time that the mulivibrator remains in its unstable state.

The foregoing description of the operation of the power supply has been given with reference to the use of horizontal synchronizing pulses 21 derived from the independently powered synchronizing signal generator 18. Such horizontal synchronizing pulses are useful only in initiating operation of the low voltage power supply because the synchronizing pulses are so modified during the vertical blanking intervals as to be unsuitable for permanent use with such apparatus. After the low voltage power supply has been placed in operation as described with the horizontal synchronizing pulses, this voltage is distributed to the camera apparatus including a horizontal drive pulse generator 29 connected to an input terminal 31 of a module to which the power supply module may be connected as indicated. Horizontal drive pulses 32 produced by the generator 29 are used to control horizontal deflection of the television camera in the usual manner. The output terminal 33 of the drive pulse generator 32 also is connected by way of module terminals 34 and 35 to the input of the pulse regenerator 17 where they are effectively connected in parallel with the horizontal synchronizing pulses 21. The synchronizing pulses are applied through a resistor 36 to the input circuit of the pulse regenerator circuit 17 at a relatively low voltage such as 2.5 volts, for example. The horizontal drive pulses 32, on the other hand, are applied to the input terminal of the pulse regenerator 17 through a resistor 37 at a considerably higher voltage such as 10 volts, for example. By this means it is seen that the low voltage power supply is initially operated to produce the desired low voltage direct current supply under the control of the horizontal synchronizing pulses. As soon as the low voltage power supply is in operation, however, to energize such apparatus such as the horizontal drive pulse generator 29 the operation of the power supply is taken over by the higher voltage horizontal drive pulses 32. These pulses are produced at the line repetition rate and are not subject to any modification during the vertical blanking intervals as are the horizontal synchronizing pulses 21.

Figures 2, 3:
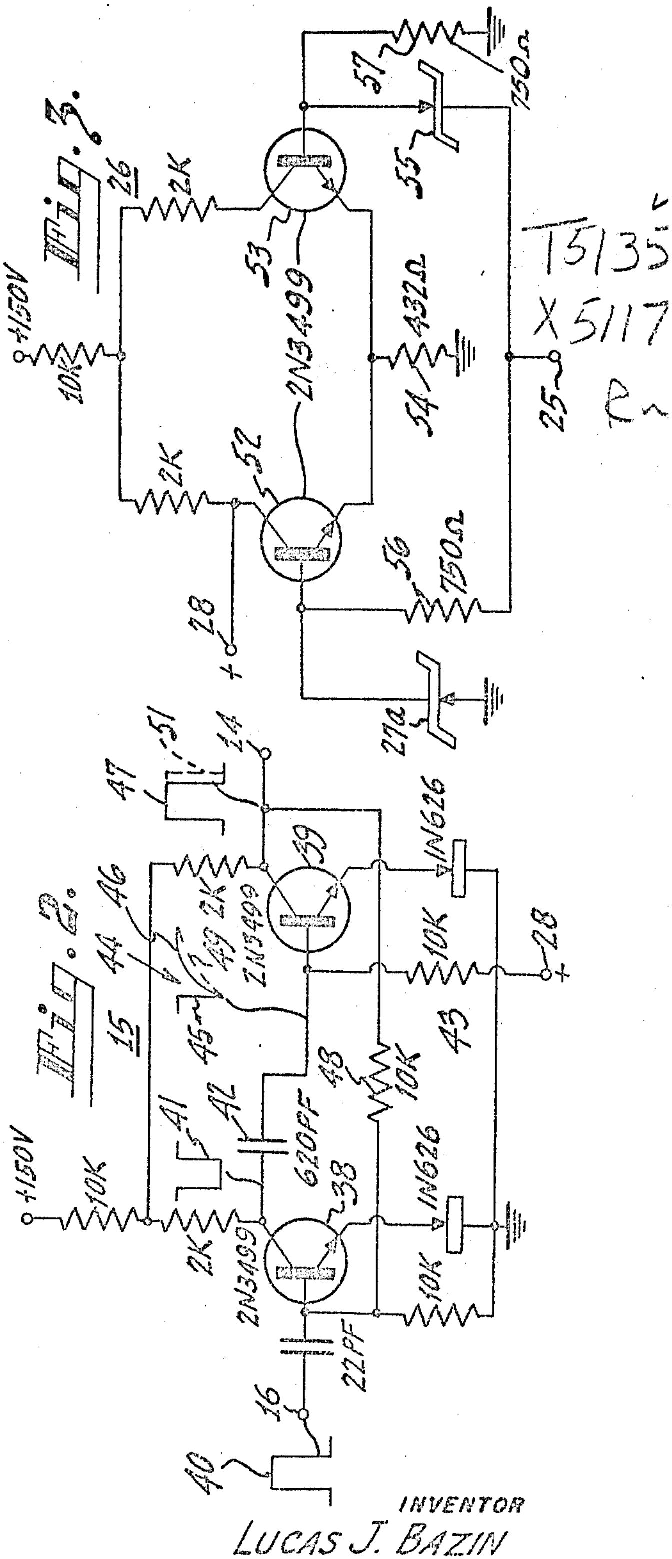
FIG. 2 is a fragmentary schematic circuit diagram of one of the components of FIG. 1 by which the keying of the relatively high voltage is controlled.
FIG. 3 is a fragmentary schematic circuit diagram of that component of FIG. 1 by which the developed low voltage is regulated by comparing it to a fixed reference voltage.

The manner in which the width of time duration of the pulses 22 is varied in order to maintain the low voltage power supply substantially constant may be seen from the circuit details of the monostable multivibrator 15 illustrated in FIG. 2. The multivibrator includes a pair of cross-coupled transistors 38 and 39 wherein the transistor 39 is conducting in the stable state of the apparatus. In response to a positive-going pulse 40 applied to the input terminal 16 of the multivibrator from the pulse regenerator 17, the transistor 38 is rendered conducting to produce a negative-going pulse 41 which, when applied to a time-constant circuit including a capacitor 42 and a resistor 43, produces a negative-going pulse 44 having a steep leading edge 45 which is applied to the base of the transistor 39 to render it nonconducting. The pulse 44 has a sloping trailing edge 46, the slope of which is determined by the values of the capacitor 42, the resistor 43 and the positive control signal voltage impressed upon the terminal 28 from the differential amplifier 26. The transistor 39 remains nonconducting until the voltage impressed upon its base electrode by the pulse 44 returns, substantially to its quiescent value at which time the transistor 39 again is rendered conducting. As a result of this operation, a positive-going pulse 47 is developed at the collector electrode of the transistor 39. When the transistor 39 is returned to its conducting state, the negative-going voltage at the collector electrode, thereof, represented by the solid line trailing edge of the pulse 47 is applied through a resistor 48 to the base electrode of the transistor 38, thereby rendering it nonconducting.

If, as previously described, the high voltage direct current supply should decrease in value, the regulating system develops a control signal which is applied to the terminal 28 and has a value such as to delay the return of the pulse 44 to its quiescent value as represented by the broken line 49. The transistor 39, thus, is maintained in its nonconducting state for a longer time, thereby developing a pulse 47 of longer time duration by delaying the production of its trailing edge as indicated by the broken line 51. Because the pulse 47 controls the switching regulator 13 of FIG. 1, it is seen that when this pulse is made wider, the on-to-off keying period ratio $t/T$ is increased to thereby maintain the voltage of the low voltage power supply substantially constant.

The manner in which the differential amplifier 26 of FIG. 1 functions to produce a control signal representative of any deviation of the low voltage power supply from its nominal value will be understood from a consideration of FIG. 3 showing the circuit details of the differential amplifier. It consists of two transistors, 52 and 53, the collector electrodes of which are similarly connected to a positive voltage source and the emitter electrodes of which are connected to a source of substantially constant current represented by the resistor 54. When the output of the low voltage power supply has the desired voltage and is applied to terminal 25, the voltages impressed upon the base electrodes of the transistors 52 and 53 are substantially equal so that the two transistors conduct substantially equal currents. In this case, a nominal control signal voltage is developed at terminal 28 for application to the multivibrator 15. When the voltage applied to terminal 25 deviates from its nominal value, the transistors 52 and 53 conduct unequal currents, the total of which, however, is the same as in the previous instance. Such operation is achieved by means of the particular connections of the Zener diodes *27a* and 55 and resistors 56 and 57. The Zener diode *27a* represents the reference voltage 27 of FIG. 1.

The Zener diodes *27a* and 55 are a matched pair having a combined voltage drop after breakdown which is substantially equal to the desired voltage of the low voltage power supply. It will be noted that, with a substantially constant current flow through the resistor 54, the emitter electrodes of the transistors 52 and 53 are always at substantially the same potential relative to ground. Also, the Zener diode *27a* maintains a substantially constant voltage relative to ground at the base electrode of the transistor 52 irrespective of the voltage applied to the terminal 25. Thus, the base-to-emitter voltage of the transistor 52 is maintained substantially constant.

The voltage realtive to ground at the base electrode of the transistor 53, however, is determined by the voltage drop across the resistor 57. Thus, when the voltage at terminal 25 deviates from the desired nominal value, the voltage drop across the resistor 57 changes bacause the voltage drop across the Zener diode 55 remains substantially constant. As a result, the base-to-emitter voltage of the transistor 53 also changes and the current conducted in the collector-to-emitter circuit of this transistor changes and, since the current in the resistor 54 remains substantially constant, the current in the collector-to-emitter circuit of the transistor 52 changes in an opposite sense. The control signal voltage at terminal 28 is thereby altered to vary the time duration or width of the keying pulse 48 as described for voltage regulation.

What is claimed is:

1. In a television camera of the type connected to television signal processing apparatus by a relatively long cable, which cable includes means for conveying a relatively high direct current voltage to said camera for conversion to a relatively low voltage by a pulse width modulation type voltage regulator, said camera being susceptible to spurious signals developed by said regulator to deleteriously affect the operation of said camera, the combination comprising:

keying means operative only during camera blanking intervals for producing pulses from said high voltage direct current source;

a low pass filter having an input and an output;

means for impressing said pulses upon said filter input so as to produce a relatively low voltage direct current supply at said filter output;

regulating means for detecting any voltage deviation of said low voltage supply from a fixed reference voltage to produce a representative control signal; and means responsive to said control signal for varying the width of said pulses to maintain the voltage of said low voltage supply substantially constant.

2. A power supply as defined in claim 1, wherein:

said keying means includes a monostable multivibrator having an opearting circuit responsive to keying pulses to operate it from its stable to its unstable state; and means for producing keying pulses occurring during said camera blanking intervals coupled to said multivibrator operating current.

3. A power supply as defined in claim 2, wherein:

said multivibrator also has a timing circuit operative to switch it from its unstable to its stable state;

the operative timing of said timing circuit being dependent upon the voltage applied to it; and means impressing said control signal upon said timing circuit to constitute said applied voltage.

4. A power supply as defined in claim 3, wherein:

said regulating means includes;

a source of reference voltage;

a differential amplifier; and means coupling said reference voltage source and said low voltage direct current power supply to said differential amplifier to produce said control signal.

5. A power supply as defined in claim 2, wherein:

said keying pulse-producing means includes a synchronizing signal generator energized independently of said low voltage direct current power supply; and said keying pulses comprise horizontal synchronizing pulses of relatively low peak voltage, said synchronizing pulses serving to initiate operation of said multivibrator, thereby resulting in the production of said low voltage direct current power supply.

6. A power supply as defined in claim 5, wherein:

said keying pulse-producing means includes a horizontal drive generator energized by said low voltage direct current power supply; and said keying pulses comprise horizontal drive pulses of realtively high peak voltage, said drive pulses being combined with and effectively replacing said synchronizing pulses and serving to permanently operate said multivibrator.

References Cited

UNITED STATES PATENTS

| | | | |
|---|---|---|---|
| 2,591,918 | 4/1952 | Cole et al. | 315—19 |
| 3,305,767 | 2/1967 | Beihl et al. | 232—22 |

ROBERT L. GRIFFIN, Primary Examiner

R. L. RICHARDSON, Assistant Examiner

U.S. Cl. X.R.

323—22

PO-1050
(5/69)

UNITED STATES PATENT OFFICE
CERTIFICATE OF CORRECTION

Patent No. 3,510,573 Dated May 5, 1970

Inventor(s) Lucas J. Bazin

It is certified that error appears in the above-identified patent and that said Letters Patent are hereby corrected as shown below:

Column 5, line 20, that portion reading "current" should read -- circuit --.
Column 6, line 15, that portion reading "drive generator" should read -- drive pulse generator --.

SIGNED AND SEALED
AUG 25 1970

(SEAL)
Attest:

Edward M. Fletcher, Jr.
Attesting Officer

WILLIAM E. SCHUYLER, JR.
Commissioner of Patents